United States Patent
Aoyagi et al.

(10) Patent No.: US 6,298,040 B1
(45) Date of Patent: Oct. 2, 2001

(54) DATA LINK LAYER PROCESSOR SYSTEM FOR A LOCAL EXCHANGE SYSTEM

(75) Inventors: Masato Aoyagi; Tomoyoshi Shimizu; Haruhiko Yamamura, all of Tokyo; Tsutomu Okurano, Miyagi, all of (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/108,725

(22) Filed: Jul. 1, 1998

(30) Foreign Application Priority Data

Jul. 1, 1997 (JP) .................................................. 9-175397

(51) Int. Cl.<sup>7</sup> .................................................. H04L 12/26
(52) U.S. Cl. .............................................. 370/219; 370/228
(58) Field of Search .................................... 370/216, 217, 370/218, 219, 220, 225, 227, 228, 235, 237, 386, 389, 537, 469; 340/825.01; 379/220, 221

(56) References Cited

U.S. PATENT DOCUMENTS

| | | | |
|---|---|---|---|
| 5,581,542 | * 12/1996 | Kato et al. | 370/219 |
| 5,712,847 | * 1/1998 | Hata | 370/228 |
| 5,715,237 | * 2/1998 | Akiyoshi | 370/228 |
| 5,870,382 | * 2/1999 | Tounai et al. | 370/220 |
| 5,909,427 | * 6/1999 | Manning et al. | 370/219 |
| 5,959,972 | * 9/1999 | Hamani | 370/228 |
| 6,034,943 | * 3/2000 | Kwon | 370/219 |
| 6,075,767 | * 6/2000 | Sakamoto et al. | 370/228 |

FOREIGN PATENT DOCUMENTS

| | | |
|---|---|---|
| 62-131652 | 6/1987 | (JP) . |
| 7-23108 | 1/1995 | (JP) . |
| 77992 | 7/1995 | (JP) . |

OTHER PUBLICATIONS

Japanese Office Action issued Jan. 5, 2000 in a related application with English translation of relevant portions.

* cited by examiner

Primary Examiner—Ricky Ngo
(74) Attorney, Agent, or Firm—Ostrolenk, Faber, Gerb & Soffen, LLP

(57) ABSTRACT

A data link layer processing (DLLP) system comprises a plurality of in-service DLLPs and a plurality of spare DLLPs. The switching between the in-service DLLP and the spare DLLP is effected by coupling both the DLLPs with the transmission line and transferring logical links from the in-service DLLP to the spare DLLP one by one while frame multiplexing the data from the spare DLLP with the data from the in-service DLLP. After all of the logical links are transferred, a switch decouples the in-service DLLP to leave the spare DLLP coupled with the transmission line for a normal operation.

13 Claims, 5 Drawing Sheets

DATA LINK LAYER PROCESSOR SYSTEM FOR A LOCAL EXCHANGE SYSTEM

BACKGROUND OF THE INVENTION (a) Field of the Invention

The present invention relates to a data link layer processor (DLLP) system for a local exchange system in a communication system and, more particularly, to a DLLP system having a redundancy scheme.

(b) Description of the Related Art

Specification for a DLLP system having an interface for multiplexing a large number of logical links on a physical link is defined in V5.1(ETS300-324), V5.2(ETS300-347), PHI(ETS300-099) in European Technical Standard (ETS), for example. Such a DLLP system generally has a m-for-n redundancy scheme wherein a plurality of (m) spare DLLPs are provided for a plurality of (n) in-service DLLPs.

Conventionally, a DLLP operating for communication in a communication system having a redundant system communicates with a counter device such as a user port while monitoring occurrence of transmission faults in the large number of logical links multiplexed on a transmission channel, and thus it is not possible to switch the channel between the in-service DLLP and the spare DLLP without cutting the data link.

As a switching method for a single physical link is disclosed in JP-B-7(1995)-7992, which used the No. 7 signal link switching system defined by CCITT. In the signal link switching system disclosed therein, signals received from a signal link are connected to a plurality of layer 2 termination circuits through a switching circuit. The layer 2 termination circuit stops receipt of a significant signal unit from the in-service signal link, and the system then reads out a plurality of error correction codes during the stop of the receipt, writes the error correction codes in the spare layer 2 termination circuit, re-starts the operation for service, and finally switch between the layer 2 termination circuits without affecting the operation of the counter device then communicating with the in-service DLLP.

In the system as described above, for switching the single physical link without affecting the communication of the data links, it is necessary to stop all communications on the multiplexed logical links, copy the states of the logical links at a high speed, and finally restart the operation. The device for copying the state of the logical links at a high speed necessitates a larger scale for the DLLP system having a m-for-n redundancy scheme. That is, it is difficult to fabricate a DLLP system with a moderate size having a m-for-n redundancy scheme and capable of switching a physical link without cutting the multiplexed data link.

There is another problem in switching the physical link in that it takes a long time to restart the operation after switching and stopping of a large number of logical links.

It is therefore an object of the present invention to provide a a DLLP system having a m-for-n redundancy scheme for a multiplexed logical links, and having a simple configuration and a moderate size.

It is another object of the present invention to provide a switching method for a DLLP system which is capable of switching a physical link between an in-service DLLP and a spare DLLP with a least stop of transmission and substantially without being affected by the number of data links multiplexed on the physical link.

In accordance with the present invention, a data link layer processing (DLLP) system is provided which comprises a physical link connected to plurality of user ports each providing a packet data on the physical link, an access network system having a first interface for multiplexing logical links on the physical link, a local exchange system having a second interface for layer 2 processing the packet data supplied through the logical links, and a transmission line for coupling the access network system and the local exchange system for implementing a part of the logical link, at least one of the first and second interfaces comprising a plurality of DLLPs including an in-service DLLP and a spare DLLP, a switch for switching between the in-service DLLP and the spare DLLP for connection with the transmission line, the switch having a multi-coupling function for coupling the transmission line to both the in-service DLLP and the spare DLLP, the in service DLLP transfers the logical links to the spare DLLP consecutively (or one by one) while frame multiplexing the packet data from the spare DLLP with data from the in-service DLLP, the switch decoupling the in service DLLP from the transmission line to leave the spare DLLP coupled with the transmission line for transmission of data on the plurality of logical links.

The multiplexing may be performed by a separate frame multiplexer for the frame multiplexing or may be implemented by a controller which controls the in-service DLLP to operate for frame multiplexing. In case of the latter, each DLLP may have a plurality of high-level data link control (HDLC) circuits, one of which is implemented as a detour data receiving circuit for receiving data from the spare DLLP to transmit the received data to the in-service HDLC coupled with the logical link during the transfer of the logical links. Alternatively, each DLLP may have a frame multiplexer for implementing the detour data receiving circuit and frame multiplexing.

In the transfer of one of the logical links (subject logical link) from the in-service DLLP to the spare DLLP, the following procedure may be used: the in-service DLLP first stops data on the subject logical link, the controller reads data relating to the subject logical link now stopped and the sequential number of the subject logical link, the controller writes the read data and the sequential number in the spare DLLP, and the spare DLLP then operates for the subject data link.

The in-service DLLP may transmit a RNR (receive not ready) signal on the subject logical link during the transfer of the subject logical link from the in-service DLLP to the spare DLLP. Alternatively, the controller may control the spare DLLP to transmit a RR (receive ready) signal after the switching is completed.

In case of the provision of the separate frame multiplexer, the separate frame multiplexer may be controlled by a controller to receive the data of the connection information of the logical data links from the in-service DLLP.

In accordance with the DLLP system of the present invention, the in-service DLLP is switched to the spare DLLP substantially without stopping the transmission from the user ports or other counter devices through the physical link, and the recovery from the switching is performed with a reduced time length.

The above and other objects, features and advantages of the present invention will be more apparent from the following description, referring to the accompanying drawings.

PREFERRED EMBODIMENTS OF THE INVENTION

Figure 1:
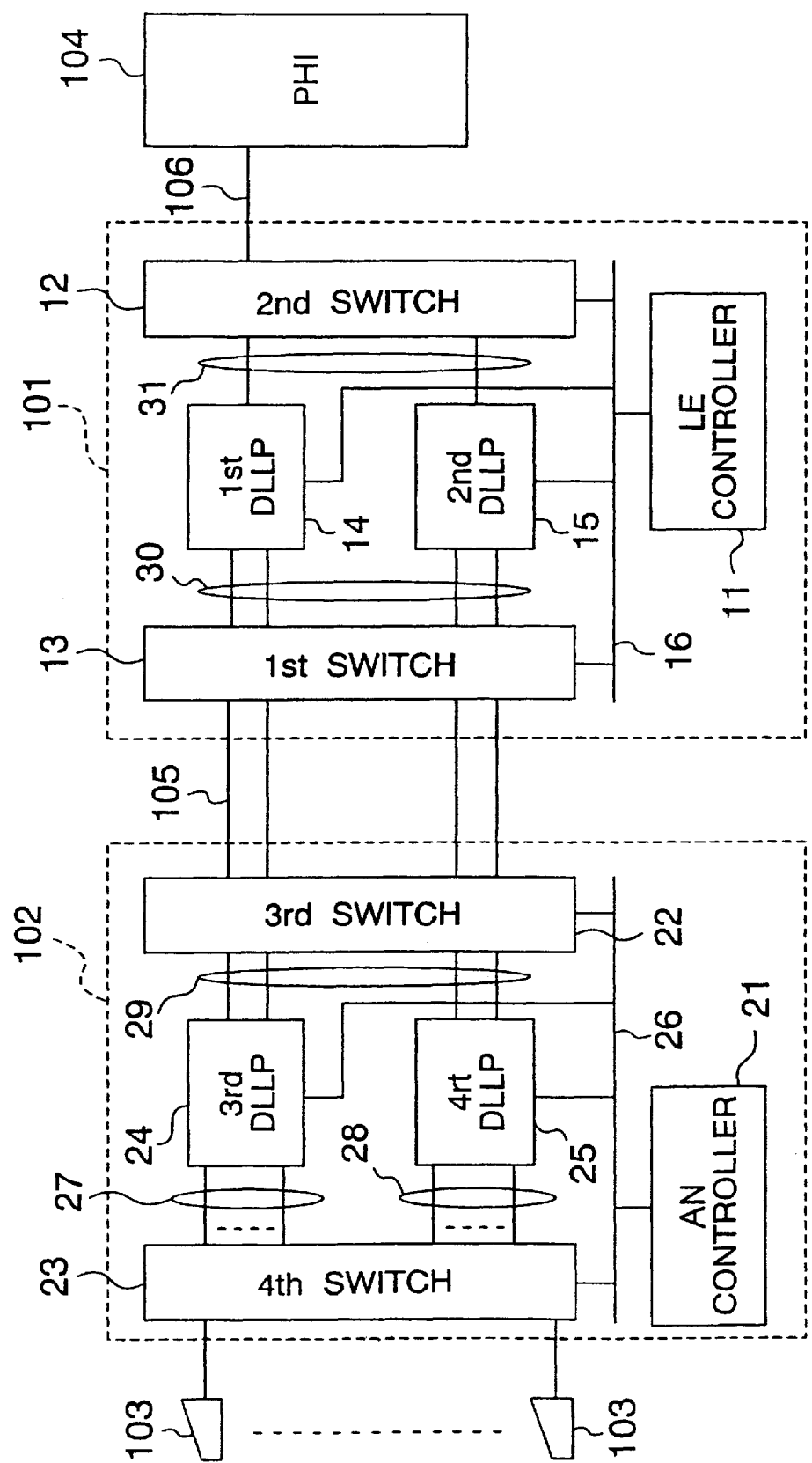
FIG. 1 is a block diagram of a DLLP system implemented on a local exchange system and an access network system according to an embodiment of the present invention.

Now, the present invention is more specifically described with reference to accompanying drawings, wherein similar constituent elements are designated by similar reference numerals.

Referring first to FIG. 1, there is shown a DLLP system implemented on a local exchanges (LE) system 101 and an associated access network (AN) system 102, wherein constituent elements other than those used for the DLLP system are omitted in the drawing.

Local exchange system 101 comprises a plurality of DLLPs including a first (in-service) DLLP 14 and a second (spare) DLLP 15, and a first switch 13 for switching received signal from a transmission line 105 to first DLLP 14 or second DLLP 15 and for switching the signals output from first DLLP 14 or second DLLP 15 to transmission line 105. First switch 13 has, in addition to a switching function as described above, a multi-coupling function for coupling input signals on a single transmission line 105 to both DLLPs 14 and 15 at the same time. In general, first switch 13 can be implemented by a time-sharing switch which is capable of sequential writing and random reading. First switch 13 is controlled by a LE controller 11 which controls the overall operation of local exchange system 101.

Local exchange system 101 further comprises a second switch 12 for coupling received signals from a packet handler interface (PHI) 104 to first DLLP 14 and/or second DLLP 15. Second switch 12 has a function similar to the first switch 13. Outputs from first DLLP 14 and second DLLP 15 to PHI 104 are also coupled through transmission line 105 to PHI 104 by second switch 12, while having a multi coupling function for connecting both DLLPs 14 and 15 at the same time. Second switch 12 is controlled by LE controller 11, similarly to first switch 13.

Signals received from transmission line 105 are transmitted through first switch 13 and channel 30 to be subjected to layer 2 termination processing by first DLLP 14 and second DLLP 15, and signals of higher-order layers are passed therethrough to LE controller 11. On the other hand, the signals of higher-order layers output from LE controller 11 are passed through channel 30 and first switch 13 to transmission line 105, after layer 2 signals are formulated and added thereto by first DLLP 14 or second DLLP 15.

Signals received from PHI 104 are passed through second switch 12 and channel 31 to first DLLP 14 and/or second DLLP 15 for layer 2 termination processing, and then transmitted to LE controller 11. On the other hand, signals of higher-order layers output from LE controller 11 are transmitted to PHI 104 through channel 31 and second switch 12 after being subjected to layer 2 formulation processing by first DLLP 14 and/or second DLLP 15. D-channel packet signals of a data transfer interface are delivered from transmission line 105 through first switch 13 and channel 30 to first DLLP 14 and/or second DLLP 15, then relayed to PHI 104 based on information set by LE controller 11.

On the other hand, D-channel packet signals are delivered from PHI 104 through second switch 12 and channel 31 to first DLLP 14 and/or second DLLP 15, then relayed to transmission line 5 based on set information from LE controller 11. The control signal from LE controller 11 and the data to LE controller 11 are transferred via bus line 16.

Access network system 102 comprises a third switch 22 for switching received signals from transmission line 105 to a plurality of DLLPs including a third (in-service) DLLP 24 and a fourth (spare) DLLP 25 and for switching outputs from the plurality of DLLPs 24 and 25 to transmission line 105. Third switch 22 has a multi-coupling function similar to first switch 13. Third switch 22 is controlled by an AN controller 21 which controls overall operation of access network system 102. Access network system 102 further comprises a fourth switch 23 for switching received signals from user ports 103 to third DLLP 24 and/or fourth DLLP 25, and for switching outputs from third DLLP 24 and fourth DLLP 25 to user ports 103. Fourth switch 23 has a multi-coupling function similar to first switch 13. Fourth switch 23 is also controlled by AN controller 21.

Signals received from transmission line 105 are transmitted through third switch 22 and channel 29, subjected to layer 2 termination processing by third DLLP 24 or fourth DLLP 25, and signals of higher-order layers therein are transferred to AN controller 21. On the other hand, signals or higher-order layers supplied from AN controller 21 are passed through channel 29 and third switch 22 to transmission line 5, after layer 2 signals are formulated and added thereto by third DLLP 24 and fourth DLLP 25.

D-channel signals between user ports 103 and local exchange system 101 are coupled by a frame relay in access network system 102. Signals received from user ports 103 are coupled through fourth switch 23 and channel 27 to third DLLP 24 (or channel 28 to fourth DLLP 25), relayed by the frame relay based on set information from AN controller 21, and passed through channel 29 and third switch 22 to transmission line 105. D-channel signals received from transmission line 105 are coupled through third switch 22 and channel 29 to third DLLP 24 and fourth DLLP 25, relayed by the frame relay based on set information from AN controller 21, and transmitted to user ports 103 through channel 27, channel 28 and fourth switch 23. The control signal from AN controller 21 and the data to AN controller 21 are transferred via bus line 26.

Figure 2:
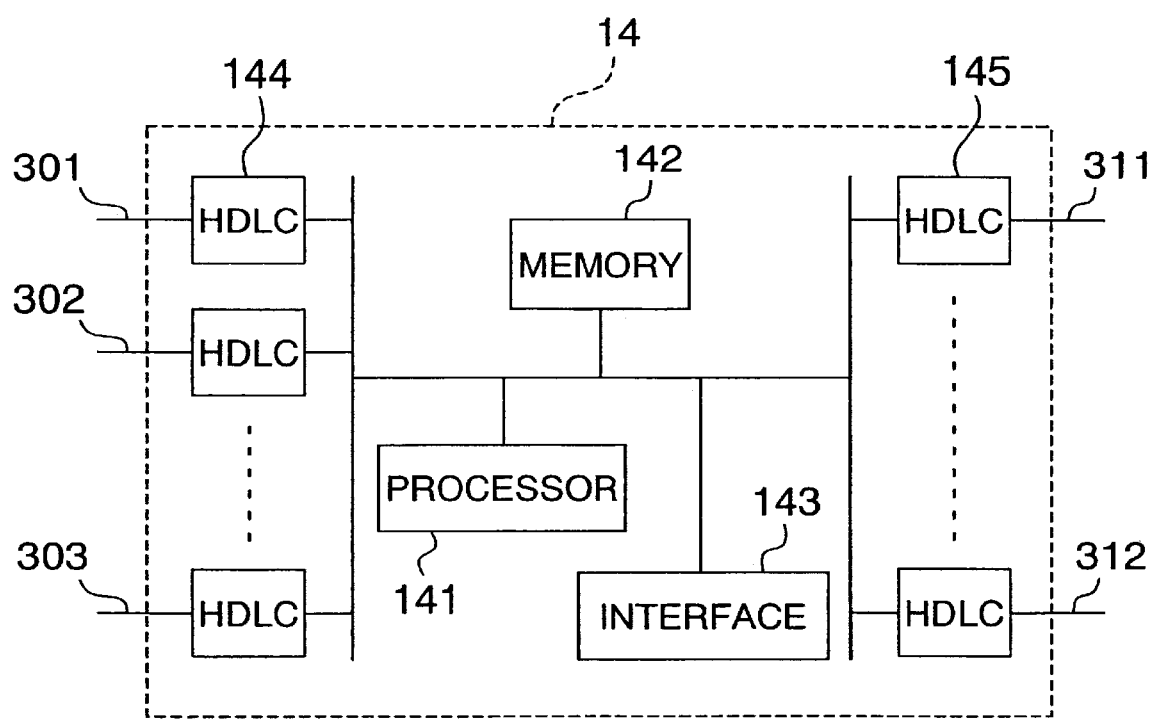
FIG. 2 is a block diagram of one of the DLLPs disposed in the local exchange system shown in FIG. 1.

FIG. 2 shows a configuration of the plurality of DLLPs in local exchange system 101, such as DLLP 14, shown in FIG. 1. First DLLP 14, as well as second DLLP 15, comprises a processor 141, a memory 142, a plurality of high-level data link control (HDLC) circuits 144 and 145, and a controller interface 143. Processor 141 controls overall operation of first DLLP 14, and has functions for performing communication with LE controller 11, layer 2 processing of link access protocol for V5 interface (LAPV5), mapping of LAPV5, layer 2 termination processing of D-channel signals from user ports, layer 2 termination processing of D-channel signals from PHI 104, and frame relay processing of D-channel packet signals.

Memory 142 is used as a storage for storing a program for operating processor 141, a buffer for temporarily storing D-channel and LAPV5 signals, a work area for storing data for the state of logical links for D-channel and LAPV5. HDLC circuits 144 and 145 have functions for flag setting, flag direction, 0 insertion, 0 deletion, error detection (cyclic redundancy code (CRC) addition and CRC check), which are known functions of typical HDLC circuits. Controller interface 143 may be implemented by a dual port memory which may be accessed both by processor 141 and LE controller 11.

Any number of HDLC circuits 144 and 145 may be provided on both transmission side and PHI side in local exchange system 101. One of HDLC circuits 144 which is connected to channel 303 is used as a detour data receiving circuit for the data link on the transmission side, whereas one of the HDLCs 145 connected to channel 312 is used as a detour data receiving circuit for the data link on the PHI side. Any of HDLCs 144 and 145 may by used such as a detour data receiving circuit based on the program used. Alternatively, the detour data receiving circuit may be implemented by the in-service HDLC based on the control by processor 141 operating on program stored therein. For example, 32 HDLC circuits 144 and 8 HDLC circuits 145 may be provided on the transmission side and the HDI side, respectively.

Figure 3:
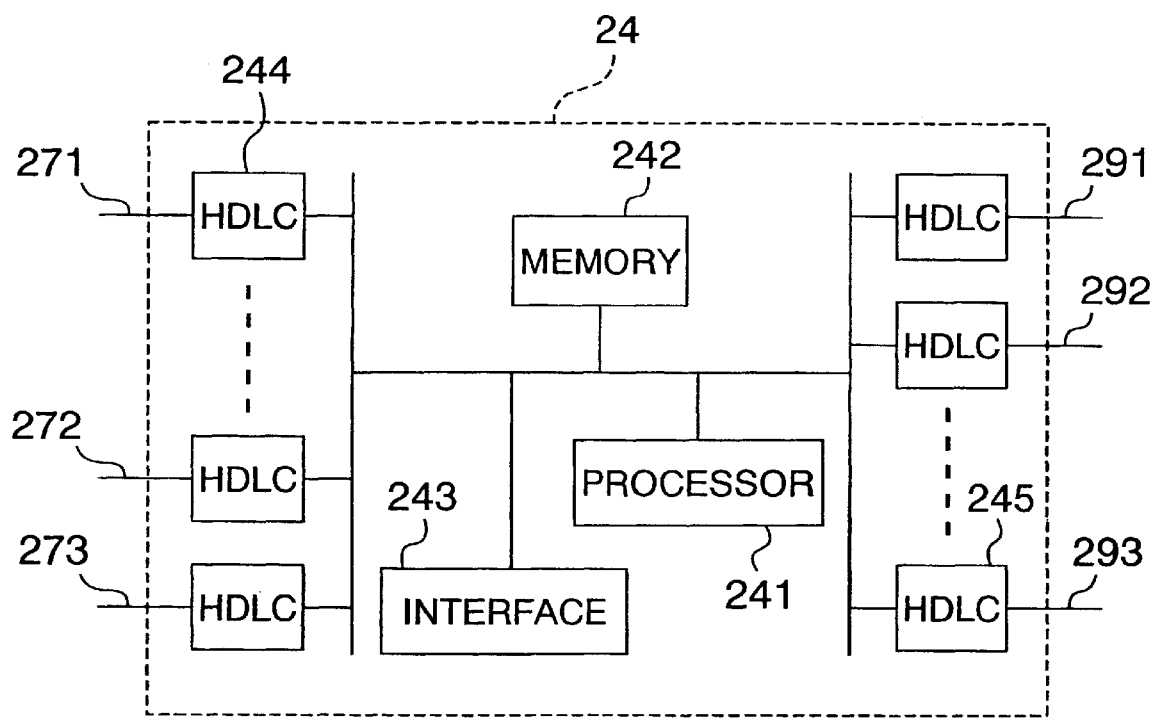
FIG. 3 is a block diagram of one of the DLLPs disposed in the access network system shown in FIG. 1.

FIG. 3 is a block diagram which shows the configuration of DLLPs in access network system 102, such as DLLP 24, shown in FIG. 1. In-service DLLP 24, as well as spare DLLP 25, in access network system 102 comprises a processor 241, a memory 242, a plurality of HDLC circuits 244 and a plurality of HDLC circuits 245 disposed on the user port side and the transmission side, respectively, and a controller interface 243.

Processor 241 controls overall operation of third DLLP 24, and has functions for communicating with AN controller 21, layer 2 processing of LAPV5, mapping of LAPV5, and frame relay processing of D channel signals. Memory 242 is used as a storage for storing a program for operating processor 241, a buffer for temporarily storing D-channel and LAPV5 signals, and a work area for storing connection information of D-channel and the state of logical links of LAPV5.

HDLC circuits 244 and 245 in access network system 102 have functions for flag setting, flag detection, 0 insertion, 0 deletion, error detection (CRC addition and CRC check), similarly to HDLC circuits 144 and 145 in local exchange system 101. Controller interface 243 is disposed for AN controller 21, and may be implemented by a dual port memory capable of being accessed by both processor 241 and AN controller 21. Any number of HDLC circuits 244 and 245 may be disposed on both sides as in the case of HDLC circuits 144 and 145. For example, 128 HDLC circuits 244 may be provided on the user side, and 8 HDLC circuits 245 on the PHI side. One of HDLC circuits 245, for example, which is connected to channel 293 may be used as a detour data receiving circuit for the data link on the transmission side. Each HDLC circuit 244 or 245 may be used as the detour data receiving circuit instead of the specific HDLC circuit based on the control by processor 241 operating on a program stored therein.

Figure 4:
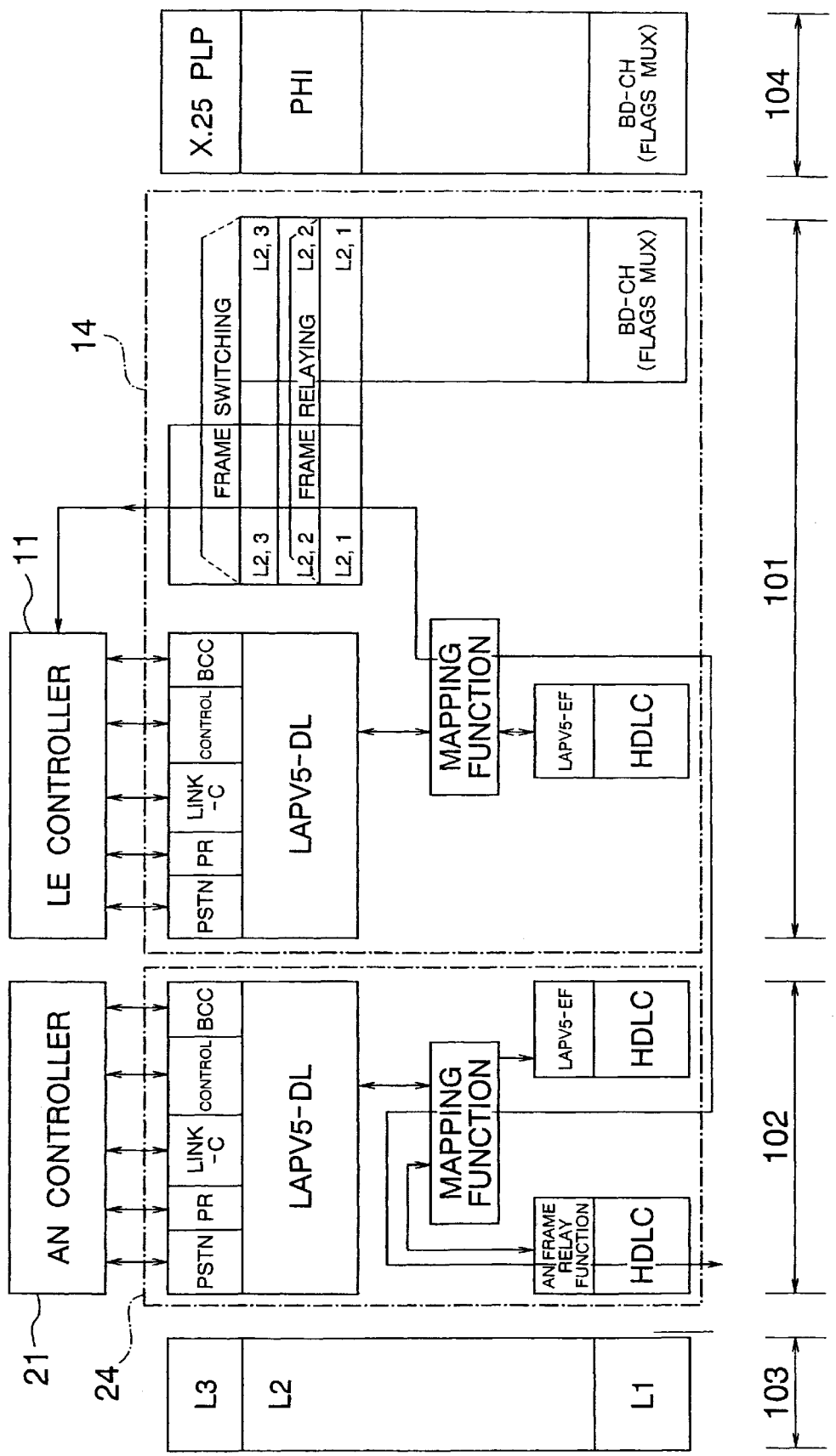
FIG. 4 is a block diagram of the DLLP system of FIG. 1 for showing the flow of the signals therein.

FIG. 4 shows a layer structure and signal flow in the DLLP system of FIG. 1, wherein DLLPs 14 and 24 are exemplarily shown in local network system 101 and access network system 102, respectively. Layer 1 is a basic protocol layer for specifying physical conditions such as communication speed or code to be used, layer 2 is called link level which has functions of error check etc., layer 3 is called network level which combines signal links, and layer 4 is called user section which includes data for transmission from the user.

Communications between LE controller 11 of local exchange system 101 and AN controller 21 of access network system 102 in a normal operational mode, including communications of analog telephone and for controlling access network system 102, are effected by using LAPV5-DL. LAPV5-DL signals are generally allocated to a physical channel by a mapping function.

The data link between local exchange system 101 and access network system 102 is implemented by a physical transmission line operating at 64 kbit/second, to which signals on a large number of data links are multiplexed by adding the address to each of the signals on the data links. The address is called envelope function (EF) address. The signals from LE controller 11 are transmitted to DLLP 14 now in service, wherein the signals are subjected to layer 2 processing by using a program, subjected to mapping function and LAPV5-EF function, subjected to formulation into a HDLC frame by using flag addition, 0 insertion, CRC addition, and then transmitted to the transmission line 105.

Access network system 102 receives signals from transmission line 105 to recover the original data in HDLC circuit 24 now in service by using flag detection, 0 deletion, and CRC check, then transmits the signals through LAPV5-EF and mapping function to LAPV5-DL. LAPV5-DL performs layer 2 termination of the data link, and transfers the received message from DLLP 24 to AN controller 21. The layer processing for other higher-order layers from LAPV5-EF to LAPV5-DL is performed by processor 241. Communication from AN controller 21 to Le controller 11 is similarly performed.

FIG. 4 also shows the data flow of D-channel signals through integrated services digital network (ISDN). The signals supplied from LE controller 11 is delivered to in-service DLLP 14 in local network system 101 to be subjected to layer 2 processing for D-channel by processor 141 operating on a program, subjected to mapping function, LAPV5-EF function, and formulation into HDLC frame by using flag addition, 0 insertion and CRC addition, then finally passed to the transmission line 105.

Access network system 102 receives the signals from the transmission line 105 to recover the original data by using flag detection, 0 deletion and CRC check in in-service DLLP 24, transmits the data through LAPV5-EF, mapping function and AN frame relay function to one of HDLC circuits, wherein the signals are subjected to formulation into HDLC frame by using flag detection, 0 deletion and CRC addition, and transmitted to the user port through a corresponding transmission line.

On the other hand, D-channel signals from one of the user ports is recovered to the original data by the HDLC circuit in the DLLP now in service in access network system 102 by using flag detection, 0 deletion and CRC check, transmitted through AN frame relay function, mapping function, and LAPV5-EF to the HDLC circuit corresponding to LAPV5, then subjected to formulation into a HDLC frame by using flag addition, 0 insertion, CRC addition by the HDLC circuit, and passed to transmission line 105.

Local exchange system 101 receives the signals from transmission line 105 to recover the original data in HDLC circuit in the DLLP 24 not in service by using flag detection, 0 deletion, and CRC check. The recovered data are then subjected to LAPV5-EF, mapping function and layer 2 termination processing of D-channel signals, and the received messages are transmitted to LE controller 11 from the DLLP 14. The layer 2 termination processing of D-channel signals is performed by either user port or DLLP 14 in local network system 101.

The coupling of the signals to PHI 104 is performed in DLLP 14 of local exchange system 101 by frame relaying D-channel packet data based on the set information from the LE controller 11. Frame switching may be used instead of the frame relaying. In FIG. 4, the D-channels of a large number of users ports are multiplexed on the channels between local exchange system 101 and access network system 102 and the physical data link to PHI 104 to form a large number of logical links. For instance, in the case of multiplexing 32 D-channels of user ports having three logical links on a single physical line, there exist 96 logical links.

Now, typically operations of the DLLP system of the present embodiment will be described, wherein it is assumed that operation of the in-service DLLP 14 is to be transferred to the spare DLLP 15 for some reasons, such as repair of DLLP 14. It is also assumed that PHI 104 is not provided therein, for the simplification of the description.

With reference to FIG. 1, LE controller 11 controls first switch 13 via bus line 16 to couple the signals received from transmission line 105 to spare DLLP 15 in addition to in-service DLLP 14 being coupled to transmission line 105. For switching the first physical link, the first physical link of transmission lines 105 connected to channel 301 in first DLLP 14 of FIG. 2 is coupled to the receiver side of channel 301 of second DLLP 15. Thus, the outputs from transmission line 105 is coupled to both the in-service and the spare DLLPs 14 and 15.

LE controller 11 controls first switch 13 via bus line 16 to couple the outputs from channel 301 of FIG. 2 in second DLLP 15 to the receiver side of channel 303 in first DLLP 14. Thus, last HDLC circuit 144 connected to channel 303 is used as a detour data receiving circuit. LE controller 11 then commands first DLLP 14 to stop operation for the first logical link multiplexed on channel 301. In first DLLP 14, data transmission by the specified first logical link is stopped, and the data received from transmission line 105 are discarded.

LE controller 11 reads out state variables of the stopped first logical link, the sequence number thereof, data waiting for response, and discarded data (or data not transmitted from first DLLP 14). LE controller 11 writes the read-out information into second DLLP 15, and commands second DLLP 15 to start operation based on the conditions similar to those used in first DLLP 14. Second DLLP 15 starts for operation for the first logical link, processing the data for the first logical link among the data from the transmission line 105, and transmitting the data through the first logical link.

The outputs from channel 30 in second DLLP 15 are then passed through the channel formed on first switch 13 to the receiver side of channel 303 in first DLLP 14. The first DLLP 14 frame-multiplexes the signals received from channel 303 onto the signals now being transmitted through channel 301. Switching of other logical links is performed similarly to the first logical link until the final logical link then processed by first DLLP is transferred. Subsequently, LE controller 11 controls first switch 13 via bus line 16 to couple the outputs from channel 301 in second DLLP 15 directly to transmission line 105 and to decouple the receiver side of channel 303 in first DLLP 14 from channel 301 and channel 301 from transmission line 105. All links implemented by in-service DLLP 14 are similarly switched to spare DLLP 15.

Switching of LAPV5-DL between DLLPs 24 and 25 in access network system 102 shown in FIG. 1 can be performed similarly to the case of local exchange system 101, as described above. Accordingly, switching of D-channel signals is described hereinafter in the case of D-channel signals from a plurality of user ports being multiplexed on the channel implemented on transmission line 105.

AN controller 21 controls third switch 22 via bus line 26 to couple the signals from transmission line 105 to fourth DLLP 25. For switching a first logical link among the plurality of logical links coupled to channel 291 in third DLLP 24 of FIG. 3 and implemented on the transmission lines 105, the first physical link is coupled to the receiver side of channel 291 in fourth DLLP 25. Thus, the outputs from transmission line 105 are coupled to both the in-service and the spare DLLPs 24 and 25. AN controller 21 controls third switch 22 via bus line 26 to couple the outputs from channel 291 in fourth DLLP 25 to the receiver side of channel 293 in third DLLP 24. Thus, the HDLC circuit 245 connected to channel 293 is used as a detour data receiving circuit.

AN controller 21 reads out from third DLLP 24 multiplexity and demultiplexity information of frame relay between D-channel and LAPV5 from the user ports using channel 291 of FIG. 3, and sets the state of fourth DLLP 25 based on the information thus read. Subsequently, AN controller 21 controls fourth switch 23 via bus line 26, switches user ports using channel 291 of FIG. 3 from third DLLP 24 to fourth DLLP 25 one by one, receives outputs from channel 291 of fourth DLLP 25 in FIG. 3 through the detour data receiving circuit connected to channel 293 of third DLLP 24 in FIG. 3, and transmits the outputs from channel 291 by frame-multiplexing the same with the signals transmitted directly from channel 291.

After all user ports using channel 291 are switched, AN controller 21 controls third switch 22 via bus line 26 and switches channel 291 of third DLLP 24 in FIG. 3 to channel 291 of fourth DLLP 25 in FIG. 3. All D-channels processed in the in-service DLLP 24 are thus switched to the spare DLLP 25.

Now, switching between PHIs will be described hereinafter with reference to FIG. 1. When RHIs 104 are to be switched therebetween in the DLLP system, it is generally necessary to switch a multiplexing interface on the LAPV5 side simultaneously with the switching between RHIs. In this description, however, only the switching between RHIs will be described for a simplification purpose. For simultaneously switching the LAPV5 side and the PHI side in the local exchange system, if the combination of logical links implemented on the physical link is different, there may be a case wherein the above-mentioned method is not applicable. In this case, the switching of the physical link by the switch can be effected after a plurality of detour data links are set and all the logical links are switched.

LE controller 11 reads out set information of multiplex and demultiplex operations for the logical links of layer 2 between D-channel and PHI 104 from first DLLP 14 via bus line 16, and sets the state of second DLLP 15 based on the set information thus read. LE controller 11 then controls second switch 12 via bus line 16 to couple the signals received from PHI 104 to second DLLP 15.

Initially, a first logical link among the large number of logical links of PHI 104 connected to channel 311 of first DLLP 14 in FIG. 2 is connected to channel 311 of second DLLP 15. Thus, the outputs from PHI 104 are coupled to both the in-service and the spare DLLPs 14 and 15. LE controller 11 then controls second switch 12 to connect the output from channel 311 of second DLLP 15 to the receiver side of channel 312 of first DLLP 14. Thus, the HDLC circuit 145 connected to channel 312 is used as a detour data receiving circuit.

Subsequently, LE controller 11 commands first DLLP 14 to stop operation of the first logical link multiplexed on channel 311. In first DLLP 14, data transmission of the first logical link is stopped based on the command, and the data received from PHI 104 are discarded. LE controller 11 reads out state variables of the stopped first logical link, sequential numbers thereof, data for waiting response, and data not transmitted from first DLLP 14. LE controller 11 then stores the read information in second DLLP 15, and commands second DLLP 15 to start operation. Second DLLP 15 starts operation for processing of the first logical link among logical links received from the transmission line 105, and transmitting the data from the first logical link.

The outputs from channel 311 in second DLLP 15 are transmitted through the channel implemented on first switch 12 to the receiver side of channel 312 in first DLLP 14. First DLLP 13 transmits the signals received from channel 312 through channel 311 by frame-multiplexing the same with the other signals. Switching of other logical links is performed one by one similarly to the case of the first logical link as mentioned above to finish the final logical link. Thereafter, LE controller 11 controls first switch 12 via bus line 16 to couple the outputs from second DLLP 15 directly to PHI 105, and to decouple the receiver side with channel 312 and channel 311 with PHI4 in first DLLP 14. Other logical links in first DLLP 141 are similarly switched.

In the operation of local exchange system 101 of FIG. 1, in-service DLLP 14 transmits a RNR (receive not ready) signal during stopping of each of the logical links, and stops the transmission of the RNR signal based on the command from LE controller 11 which is delivered after the switching between the DLLPs 14 and 15 is completed. Spare second DLLP 15 starts, responsive to the RNR signal, for operation of transmission in a RNR operational mode wherein DLLP 15 is dedicated to transmission of received data without receipt of new data, and switches from the RNR operational mode to a normal operational mode based on the command from LE controller 11 after the switching is completed. By this configuration, user ports are prohibited from transmission of new data onto the logical links during the switching between DLLPs 14 and 15, which assures reduction of retransmission of data from user ports and increase in the speed of the recovery from the switching procedure.

Alternatively, spare second DLLP 15 may transmit a RR (receive ready) signal for the logical links processed by second DLLP based on the command from LE controller 11 during the switching procedure. The RR signal may be transmitted for all of the logical links immediately after the switching procedure is completed, which assures reduction of retransmission and recovery from the switching procedure.

Figure 5:
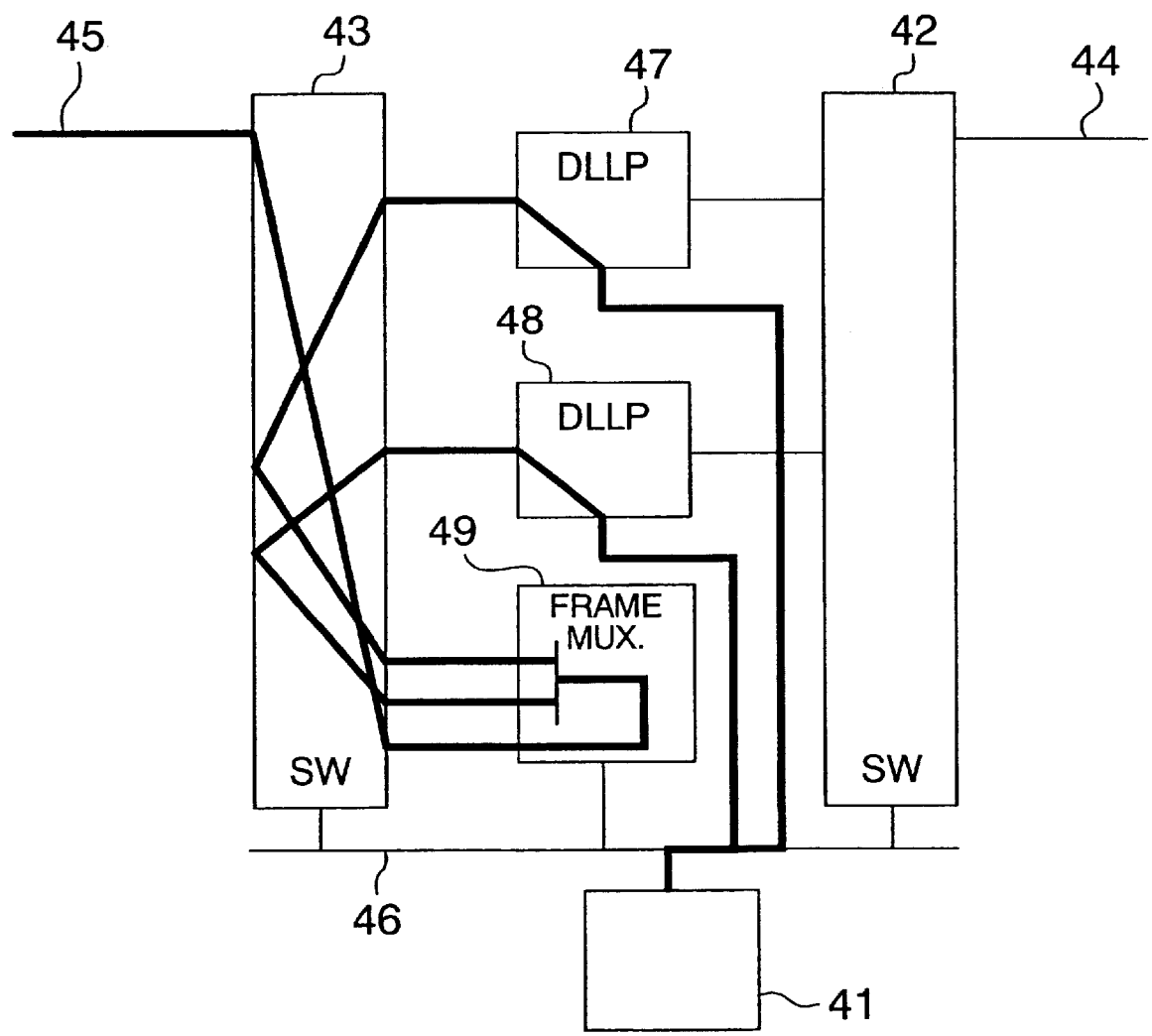
FIG. 5 is a block diagram of a DLLP system according to another embodiment of the present invention.

FIG. 5 shows connections in a local network system 101 (or access network system 102) of a DLLP system according to a second embodiment of the present invention during the switching procedure. The local network system 101, for example, comprises a LE controller 41, a first DLLP 47, a second DLLP 48, a frame multiplexer 49, a first switch 43 and a second switch 42, which are similar to those as described above in connection with the first embodiment except for the frame multiplexer 49. The signals transmitted from first and second DLLPs 47 and 48 are coupled through first switch 43 to multiplexer 49, which multiplex the signals by using frame multiplexing technique for transmission through first switch 43 and transmission line 45. In this embodiment, detour data receiving circuit is not necessary for each DLLP 47 or 48. As a result, in the case of a large number of DLLPs provided in the local network system 101, a large number of detour data receiving circuits are replaced by a single frame multiplexer.

The frame multiplexer may have functions for selecting the transmission signals from first DLLP 47 or the transmission signals from second DLLP 48 based on the address of the logical link, and for setting connection information therein for the logical links based on the data supplied from controller 101. For switching between the DLLPs 47 and 48, spare second DLLP 48 is set for normal operation mode while in-service DLLP 47 delivers the RNR signal. Frame multiplexer 49 controls spare DLLP 47 to deliver the data and finally the channel is switched. In this configuration, a simple procedure can be obtained.

AN controller 21 in access network system 102 in FIG. 1 may have functions for simultaneously switching from the state of the connection between user ports 103 and in-service third DLLP 24 to the state of connection between user ports 103 and spare fourth DLLP 25 and from the state of connection between third DLLP 24 and transmission line 105 to the state of connection between fourth DLLP 25 and transmission line 105 based on the setting of both the third DLLP 24 and fourth DLLP 25 from AN controller 21. In this configuration, a simple switching procedure and higher speed switching can be obtained, although the possibility of occurrence of retransmissions may be increased.

In access network system 102 of FIG. 1, third and fourth DLLPs 24 and 25 may have functions for transmitting a RNR signal through the logical link on D-channel of the user ports 103 based on the control by AN controller 21. In this case, after third DLLP 24 and fourth DLLP 25 transmit the RNR signal, fourth switch 23 operates for switching D-channel of the user ports, in-service DLLP 24 stops operation for multiplexing and demultiplexing, spare DLLP 25 stops transmission of the RNR signal and starts for normal multiplexing and demultiplexing. This switching procedure is performed for each logical link one by one while transmitting the RNR signal for avoiding retransmission of data. However, access network system 102 performs multiplexing for each user port in general, and thus it may occur that access network system 102 cannot recognize the address of the logical link for which the RNR signal is transmitted. Accordingly, in this case, another RNR signal should be transmitted to the user port to which the RNR signal is transmitted by return if data is transmitted from the user port or to the user port.

Alternatively, DLLPs 24 and 25 in access network system 102 may have functions for transmitting RNR signals to the logical links on the D-channel of all the user port and the logical links on all LAPV5. In this case, after transmitting the RNR signals to all the logical links from DLLPs 24 and 25, switching operation is effected, spare DLLP 25 stops transmission of RNR signals to all the logical links and restarts for normal multiplexing and demultiplexing. In this configuration, it is possible to simplify the switching at a higher speed while transmitting the RNR signals.

Since the above embodiments are described only for examples, the present invention is not limited to the above embodiments and various modifications or alterations can be easily made therefrom by those skilled in the art without departing from the scope of the present invention.

What is claimed is:

1. A data link layer processing (DLLP) system comprising a physical link connected to a plurality of user ports each providing a packet data on said physical link, an access network system having a first interface for multiplexing logical links on said physical link, a local exchange system having a second interface for layer 2 processing said packet data supplied through said logical links, and a transmission line for coupling said access network system and said local exchange system for implementing a part of said logical link, at least one of said first and second interfaces comprising a plurality of DLLPs including an in-service DLLP and a spare DLLP, a switch for switching between said in-service DLLP and said spare DLLP for connection with said transmission line said switch having a multi-coupling function for coupling said transmission line to both said in-service DLLP and said spare DLLP, said in-service DLLP transfers said logical links to said spare DLLP one by one, while frame multiplexing, said packet data from said spare DLLP with data from said in-service DLLP, said switch decoupling said in-service DLLP from said transmission line to leave said spare DLLP coupled with said transmission line for transmission of data on said plurality of logical links.

2. A DLLP system as defined in claim 1, wherein said frame multiplexing is performed by said in-service DLLP.

3. A DLLP system as defined in claim 2, wherein said in-service DLLP has a plurality of high-level data link control (HDLC) circuits each connected to a corresponding one of said logical links.

4. A DLLP system as defined in claim 3, wherein said HDLC circuits corresponding to said remaining logical links perform said frame multiplexing, one of said HDLC circuits receiving said packet data from said spare DLLP to implement a detour data receiving circuit.

5. A DLLP system as defined in claim 1, wherein said in-service DLLP further comprises a frame multiplexer for implementing a detour data receiving circuit and performing said frame multiplexing.

6. A DLLP system as defined in claim 1, wherein state variables of in-service DLLP relating one of said logical links are stored in said spare DLLP before said transfer of said one of logical links.

7. A DLLP system as defined in claim 1, wherein said in-service DLLP transmits a receive not ready signal to said user ports before said transfer of one of said logical links.

8. A DLLP system as defined in claim 1, wherein said spare DLLP transmits a receive ready signal after said decoupling of said in-service DLLP.

9. A DLLP system as defined in claim 1, wherein said at least one of said first and second interfaces further comprises a frame multiplexer for performing said frame multiplexing.

10. A DLLP system as defined in claim 1, wherein said in-service DLLP transmits a receive not ready signal to said user ports before said transfer on one of said logical links.

11. A DLLP system as defined in claim 1, wherein said spare DLLP transmits a receive ready signal after said decoupling of said in-service DLLP.

12. A DLLP system as defined in claim 1, wherein said in-service DLLP transmits a receive not ready (RNR) signal to all of said logical links before said transfer of one of said logical links, and stops said transmission of said RNR signal after said decoupling of said in-service DLLP.

13. A data link layer processing (DLLP) system comprising a local exchange system for layer 2 processing packet data supplied from user ports on logical links, a packet handler for multiplexing said logical links on a physical link, and a transmission line for coupling said local exchange system and said packet handler for implementing a part of said logical link, at least local exchange system comprising a plurality of DLLPs including an in-service DLLP and a spare DLLP, a switch for switching between said in-service DLLP and said spare DLLP for connection with said transmission line, said switch having a multi-coupling function for coupling said transmission line to both said in-service DLLP and said spare DLLP, said in-service DLLP transfers said logical links to said spare DLLP one by one while frame multiplexing said packet data from said spare DLLP with data from said in-service DLLP, said switch decoupling said in-service DLLP from said transmission line to leave said spare DLLP coupled with said transmission line for transmission of data on said plurality of logical links.

* * * * *